(12) United States Patent
Yoo et al.

(10) Patent No.: US 6,243,216 B1
(45) Date of Patent: Jun. 5, 2001

(54) FAST RESPONDING OPTICAL MODULATOR

(75) Inventors: Jang-hoon Yoo; Pyong-yong Seong, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 794 days.

(21) Appl. No.: 08/508,250

(22) Filed: Jul. 27, 1995

(30) Foreign Application Priority Data

Feb. 25, 1995 (KR) .................................................. 95-3761

(51) Int. Cl.[7] .............................. G02B 9/04; G02B 15/14; G02F 1/11
(52) U.S. Cl. ..................... 359/793; 359/237; 359/794; 359/285; 359/691; 369/112; 347/244
(58) Field of Search ....................... 359/237, 241, 359/793, 794, 679, 656–661, 691, 719, 285–287; 369/112; 347/244

(56) References Cited

U.S. PATENT DOCUMENTS

| | | | |
|---|---|---|---|
| 3,576,358 | * 4/1971 | Hayamizu et al. | 359/691 |
| 4,201,455 | * 5/1980 | Vadasz et al. | 359/286 |
| 4,752,922 | * 6/1988 | MacAnally | 369/32 |
| 4,952,035 | * 8/1990 | Yuasa | 350/354 |
| 5,187,600 | * 2/1993 | Sato | 369/112 |
| 5,377,212 | * 12/1994 | Tatsuno | 372/22 |
| 5,475,537 | * 12/1995 | Kobayashi | 359/794 |

FOREIGN PATENT DOCUMENTS 60-229007   11/1985   (JP) .

* cited by examiner

Primary Examiner—Georgia Epps
Assistant Examiner—Evelyn A. Lester
(74) Attorney, Agent, or Firm—Burns, Doane, Swecker & Mathis, LLP

(57) ABSTRACT

A fast responding optical modulating device for a high-density recording using in an optical pickup includes a light source, an optical modulator and a pair of lenses. The pair of lenses are so arranged that the distance between the lenses is shorter than the sum of each focal length of the lenses. The device can adjust an optical spot size at the center of the optical modulator by changing the position of the lenses without altering the whole length between the light source and optical modulator. Therefore, the device can increase the rise time as desired and the optical efficiency in optical modulation for high-density recording which uses a short wavelength light source, and moreover, has an effect of simplifying the high-density recording.

10 Claims, 2 Drawing Sheets

FAST RESPONDING OPTICAL MODULATOR

BACKGROUND OF THE INVENTION

Field of the Invention

The present invention relates to an optical modulator for recording information on an optical disk in an optical pickup for the reproduction of recorded information, and more particularly, to a fast responding optical modulator for high-density recording.

Generally, a light source of a short wavelength is essential for the high-density recording of optical information. For the light source generating a short wavelength light, a second harmonic generation (SHG) laser is currently favored in the high-density recording area using a wavelength of 532 nm or below. However, unlike a conventional semiconductor laser, since SHG laser cannot provide a modulated light itself, an external modulator for modulating light is required during the recording operation. Accordingly, for modulating light from the SHG laser, an optical modulator such as an electro-optical modulator or acousto-optical modulator is usually employed.

A magnetic domain on an optical disk can be adjusted easily at fast rise and fall times of a modulated light. Thus, when external optical modulation is employed, the improvement of a fast response is required.

The rise time of the optical modulator is related to the optical modulation efficiency. As shown in the graph of FIG. 1, the rise time becomes faster and an optical efficiency becomes lower, as the spot size of a light beam which passes through the center of the optical modulator becomes smaller. Therefore, there is a need for optimizing the optical efficiency and the rise time in configuring an optical pickup using an optical modulator. For example, when the quantity of an optical spot is determined within the hatched area in the graph of FIG. 1, the result satisfies the rise time of 8 ns and below and the optical efficiency of 80% and over.

Meanwhile, because such conditions as light spreading angle of laser or beam diameter are not exactly congruous with each other even when a laser of the same specification is adopted, there is a non-uniformity between the optical efficiency and rise time of each optical modulator, which must be taken into consideration.

FIG. 2 shows a conventional optical modulator. A light beam emitted from light source 1 travels through a collimator lens 2 and a focus lens 3 in this order and passes through the center of a optical modulator 4. To adjust an optical spot size penetrating the center of the optical modulator 4, there is a method of altering the distance ($L_1$+D) between light source 1 and focus lens 3, or focal length $L_2$ of focus lens 3. By the way, in using the above method to alter the distance ($L_1$+D) or the length $L_2$ of an optical system, the whole optical system of an optical pickup must be reset or a focus lens 3 has to be remanufactured, since the total distance $L_T$ ($L_1$=D+$L_2$) between light source 1 and optical modulator 4 is altered.

On the other hand, when focal lens 3 is defocused without altering the distance $L_T$ between light source 1 and optical modulator 4, the optical spot size is enlarged rather than reduced in size, so that a faster rise time becomes impossible. This is due to the fact that distance D between collimator lens 2 and focus lens 3 is greater than the sum of the focal lengths of the lenses 2 and 3.

SUMMARY OF THE INVENTION

To solve the above problems, it is an object of the present invention to provide a fast responding optical modulator satisfying both the fast rise time and the high optical efficiency.

Accordingly, to achieve the above object, there is provided a fast responding optical modulating device comprising: a light source; an optical modulator; a pair of lenses arranged in this order between the light source and the optical modulator and for concentrating light generated from the light source on the center of the optical modulator, wherein the pair of lenses are so arrayed that the distance between the pair of lenses is shorter than the sum of the focal lengths of the pair of lenses.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
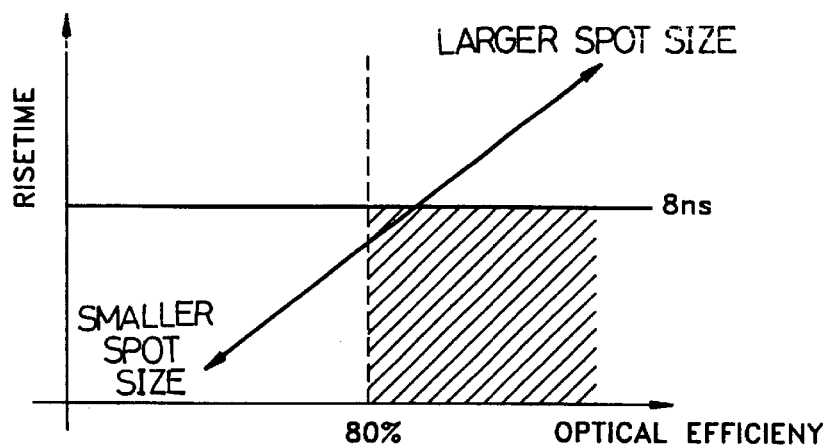
FIG. 1 shows a graph illustrating the correlation between a rise time in an optical modulator and an optical efficiency according to an optical spot size.
Figure 2:
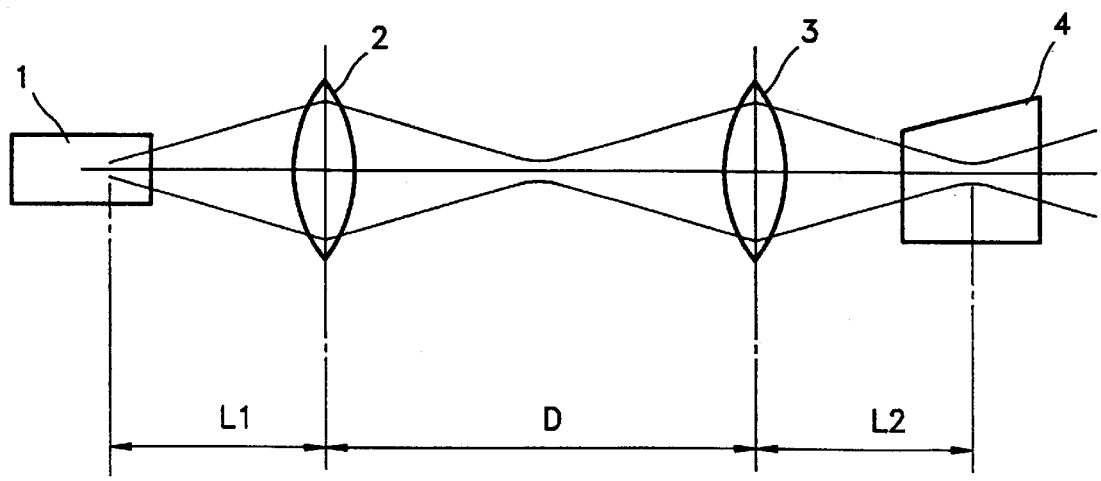
FIG. 2 is a view illustrating the optical configuration of a conventional optical modulator.
Figure 3:
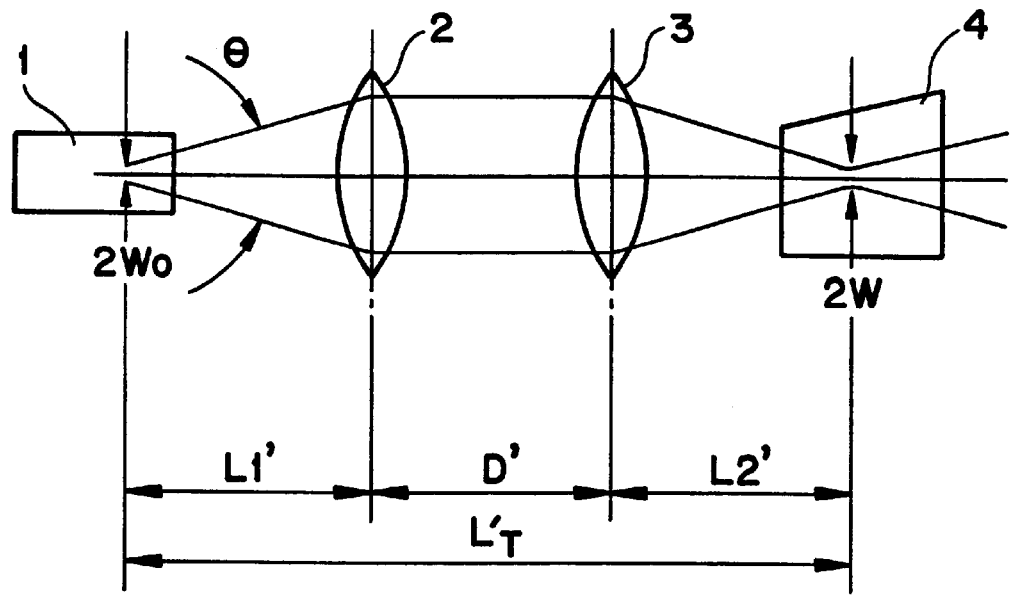
FIG. 3 is a view illustrating the optical configuration of an optical modulator according to an embodiment of the present invention.

A fast responding optical modulator according to a preferred embodiment of the present invention is shown in FIG. 3. In FIG. 3, the same reference numerals as in FIG. 2 are used for the indication of the same portions. Namely, reference numeral 1 is a light source such as the SHG laser, reference numeral 2 is a collimator lens, reference numeral 3 is a focus lens, and reference numeral 4 is an optical modulator such as an acousto-optical or electro-optical modulator. Here, given the distance between the light source 1 and collimator lens 2 as $L_1'$, the distance between the collimator lens 2 and the focus lens 3 as D' and the distance between the focus lens 3 and the optical modulator 4 as $L_2'$, the distance $L_T'$ between the centers of light-emitting position of the light source 1 and modulating position of the optical modulator 4 is constant and satisfies the following condition.

$$L_T' = L_1' + D' + L_2' > 2D'$$

Figure 4:
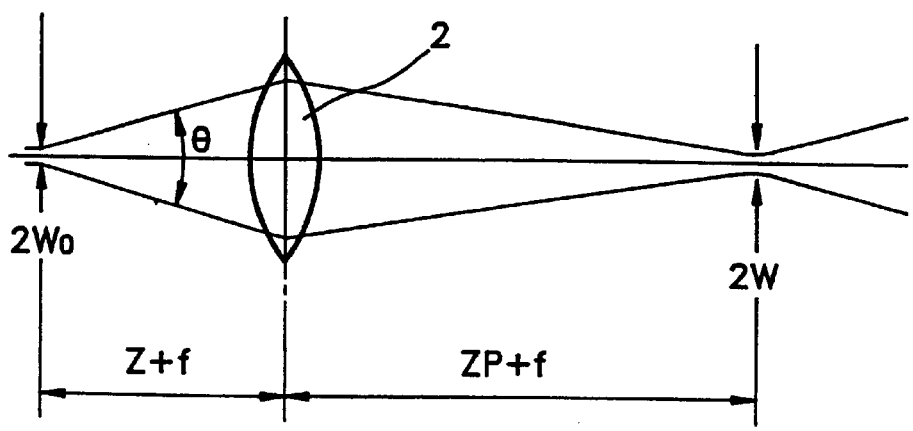
FIG. 4 shows a profile showing a part of the optical configuration to calculate an optical spot size in an optical modulator according to the present invention.

FIG. 4 shows a profile of part of the system, to calculate an optical spot size concentrated on the center of the optical modulator 4.

When an optical spot having a particular diameter exists from a diffraction light, the relationship of radius $W_0$ and spreading angle $\theta$ of the optical spot is as follows.

$$\theta = \frac{2\lambda}{\pi W_0}$$

Here, $\lambda$ is wavelength.

When an optical spot having a constant radius $W_0$ and a constant spreading angle $\theta$ is concentrated by the lens 2 having a focal length f, then the following holds true.

$$W^2 = \frac{f^2}{\frac{z^2}{W_0^2} + \frac{4}{\theta^2}}$$

$$M = \frac{W}{W_0}$$

$$ZP = M^2 Z$$

$$L_2' = f + ZP$$

Here, W is the radius of the optical spot concentrated by the lens 2, Z is the distance that subtracts the focal length from the point object length of the lens 2, ZP is the distance that subtracts the focal length from the point image length of the lens 2, M is the magnification of the lens 2, f is the focal length of lens 2, and $L_2'$ is a point image length of the lens 2.

From the above relationship, the size (radius) of the optical spot concentrated on the center of optical modulator 4 after being passed in order via lenses 2 and 3 can be obtained.

The following Table 1 contains theoretically calculated data of the optical spot size formed on the center of optical modulator 4 according to the position of each lens when the distance $L_T'$ between light source 1 and optical modulator 4 is constant. Table 2 contains the data measured under the same condition as above. The optical conditions applied to the optical system of FIG. 3 are: (a) the light spreading angle θ from light source 1 is 12.5 mrad, (b) the light spot radius at light source 1 is 27 μm, the focal length $L_1'$ of collimator lens 2 is 24.5 mm, and the focal length $L_2'$ of the focus lens 3 is 28.8 mm.

TABLE 1

| $L_1'$ | D' | $L_2'$ | $L_T'$ | optical spot size |
|---|---|---|---|---|
| 24.0 mm | 33.0 mm | 28.5 mm | 85.5 mm | 64.2 μm |
| 24.5 mm | 33.0 mm | 28.0 mm | 85.5 mm | 63.0 μm |
| 25.5 mm | 33.0 mm | 27.5 mm | 85.5 mm | 61.0 μm |
| 33.5 mm | 33.0 mm | 19.0 mm | 85.5 mm | 48.5 μm |

TABLE 2

| $L_1'$ | D' | $L_2'$ | $L_T'$ | optical spot size |
|---|---|---|---|---|
| 23.0 mm | — | 28.5 mm | 85.5 mm | 64.0 μm |
| 24.5 mm | — | 28.0 mm | 85.5 mm | 63.0 μm |
| 25.5 mm | — | 27.5 mm | 85.5 mm | 61.0 μm |

On the other hand, Table 3 contains the measured data data of a rise time and a fall time during modulation as the variation of the rise time of an optical modulator according to the optical spot size (radius).

TABLE 3

| optical spot size | rise time | fall time |
|---|---|---|
| 42 μm | 6.9 ns | 7.3 ns |
| 52 μm | 6.5 ns | 7.4 ns |
| 63 μm | 9.1 ns | 9.0 ns |
| 84 μm | 9.4 ns | 11.1 ns |

As described above, the present invention can adjust an optical spot size by defocusing of a lens within an optical pickup without altering the whole length $L_T'$ of an optical system. Therefore, the present invention increases rise time and the optical efficiency of an optical pickup for high-density recording using a short-wavelength light source, and moreover, has an effect of simplifying the high-density recording.

And the present invention optimize the rise time and optical efficiency of an optical pickup without changing the over all length of optical path. The optimization can be achieved by defocusing collimating lens and focusing lens of an optical modulator.

It will be appreciated that the present invention is not limited to the exemplary embodiments disclosed herein, but includes variations thereof. The metes and bounds of the invention are reflected in the accompanying claims.

What is claimed is:

1. An optical modulating device comprising:
   a light source;
   an optical modulator; and
   a pair of lenses arranged along a light path between said light source and optical modulator, including a collimating lens and a focal lens for focusing light generated from said light source into a spot on the center of said optical modulator,
   wherein said pair of lenses are so arrayed that the distance between said pair of lenses is shorter than the sum of the focal lengths of said pair of lenses.

2. An optical modulating device according to claim 1, wherein the distance between said light source and said optical modulator is fixed and said pair of lenses can be selectively moved.

3. An optical modulating device according to claim 2, wherein the distance $L_T'$ between said light source and said optical modulator is equal to $L_1'+D'+L_2'$ and is greater than 2D', where $L_1'$ is the distance between said light source and said collimating lens, D' is the distance between said collimating lens and said focal lens, and $L_2'$ is the distance between said focus lens and said optical modulator.

4. A optical modulating device according to claim 1, wherein said light source is a second harmonic generation laser.

5. An optical modulating device according to claim 1, wherein said modulator is an acousto-optical modulator.

6. An optical pick-up for high density recording, comprising:
   a laser;
   an optical modulator; and
   a pair of lenses arranged along a light path between said laser and optical modulator, including a collimating lens and a focal lens for focusing light generated from said laser into a spot on the center of said optical modulator,
   wherein said pair of lenses are so arrayed that the distance between said pair of lenses is shorter than the sum of the focal lengths of said pair of lenses.

7. An optical pick-up according to claim 6, wherein the distance between said laser and said optical modulator is fixed and said pair of lenses can be selectively moved.

8. An optical pick-up according to claim 7, wherein the distance $L_T'$ between said laser and said optical modulator is equal to $L_1'+D'+L_2'$ and is greater than 2D', where $L_1'$ is the distance between said laser and said collimator lens, D' is the distance between said collimating lens and said focal lens and $L_2'$ is the distance between said focus lens and said optical modulator.

9. An optical pick-up according to claim 6, wherein said laser is a second harmonic generation laser.

10. An optical pick-up according to claim 6, wherein said modulator is an acousto-optical modulator.

* * * * *